United States Patent
Taylor et al.

(10) Patent No.: US 12,521,625 B2
(45) Date of Patent: Jan. 13, 2026

(54) INFERENCE WINDOW FOR GESTURE INPUT

(71) Applicant: Sony Interactive Entertainment Inc., Tokyo (JP)

(72) Inventors: Michael Taylor, San Mateo, CA (US); Yasunori Matsui, San Mateo, CA (US); Yurika Kondo, Tokyo (JP); Mihee Kang, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 280 days.

(21) Appl. No.: 18/348,301

(22) Filed: Jul. 6, 2023

(65) Prior Publication Data
US 2025/0010181 A1 Jan. 9, 2025

(51) Int. Cl.
| | |
|---|---|
| A63F 13/215 | (2014.01) |
| A63F 13/424 | (2014.01) |
| A63F 13/428 | (2014.01) |
| A63F 13/44 | (2014.01) |
| A63F 13/67 | (2014.01) |
| A63F 13/79 | (2014.01) |
| G06F 3/16 | (2006.01) |
| G06N 20/00 | (2019.01) |

(52) U.S. Cl.
CPC ............ *A63F 13/44* (2014.09); *A63F 13/424* (2014.09); *A63F 13/428* (2014.09); *A63F 13/67* (2014.09)

(58) Field of Classification Search
CPC ...... A63F 13/211; A63F 13/355; A63F 13/40; A63F 13/42; A63F 13/428; A63F 13/67; A63F 2300/8082; G06N 20/00; G06F 3/017

See application file for complete search history.

(56) References Cited

U.S. PATENT DOCUMENTS

| | | |
|---|---|---|
| 11,717,748 B2 | 8/2023 | Bleasdale-Shepherd et al. |
| 2012/0238364 A1 | 9/2012 | Kurita et al. |
| 2015/0297986 A1* | 10/2015 | Dal Mutto ............. A63F 13/42 463/31 |
| 2018/0345128 A1 | 12/2018 | Ahmed et al. |
| 2020/0129851 A1* | 4/2020 | Sardari ................ G06N 20/00 |
| 2021/0146241 A1 | 5/2021 | Bleasdale-Shepherd et al. |
| 2021/0154583 A1 | 5/2021 | Osman |
| 2023/0009378 A1 | 1/2023 | Borovikov et al. |
| 2025/0010199 A1 | 1/2025 | Taylor et al. |

OTHER PUBLICATIONS

"International Search Report and Written Opinion", dated Oct. 21, 2024, from the counterpart PCT application PCT/US24/33861.

* cited by examiner

*Primary Examiner* — Lawrence S Galka
(74) *Attorney, Agent, or Firm* — Fish & Richardson P.C.

(57) ABSTRACT

A system is configured to determine a window of time during which to execute a particular gesture or voice command to a computer game. The system otherwise does not execute the command outside the window of time, helping to reduce false positives from unintended input.

17 Claims, 5 Drawing Sheets

INFERENCE WINDOW FOR GESTURE INPUT

FIELD

The disclosure below relates generally to inferred windows of time during which to monitor for gesture input to a computer game.

BACKGROUND

As recognized herein, one of the technical challenges facing computer game developers and console makers alike is the need to correctly identify gesture and speech input to a computer game to distinguish that input from other natural gestures and speech that might be unrelated to the game. For instance, a player might make an unrelated gesture or speak to a non-player while the game is executing, but the game system still picks up on the gesture or speech and executes a corresponding game command even though the player did not intend to actually control the game. This in turn adversely affects gameplay, sometimes to a significant degree. There are currently no adequate solutions to the foregoing computer-related, technological problems.

SUMMARY

Accordingly, in one aspect an apparatus includes at least one processor assembly programmed with instructions to execute a computer game and to receive game state data related to the execution of the computer game. The at least one processor assembly is also programmed with instructions to identify, based on the game state data and during the execution of the computer game, a first window of time during which to execute a command in conformance with a first non-computer game controller input to the computer game. The at least one processor assembly is further programmed with instructions to identify the first non-computer game controller input during the first window of time and to execute the command in relation to the computer game based on the identification of the first non-computer game controller input during the first window of time. The command is executed in conformance with the first non-computer game controller input.

Thus, in one example implementation the game state data may be first game state data and the at least one processor assembly may be programmed with instructions to receive second game state data related to the execution of the computer game. Here the at least one processor assembly may be programmed with instructions to then identify, based on the second game state data and during the execution of the computer game, a second window of time during which to not execute the command in conformance with the first non-computer game controller input to the computer game. The at least one processor assembly may therefore also be programmed with instructions to, during the second window of time, not execute the command in relation to the computer game. Not executing the command may include not processing the first non-computer game controller input to the computer game, and/or may include processing the first non-computer game controller input to the computer game but not executing the command in conformance with the first non-computer game controller input.

In various examples, the first non-computer game controller input may include gesture input. So the apparatus might include a camera and the gesture input may be identified using one or more images from the camera.

Also in various examples, the first non-computer game controller input may include voice input. So the apparatus might also include a microphone and the voice input may be identified using voice data from the microphone.

Additionally, if desired the game state data may indicate a first context associated with execution of the computer game and the at least one processor assembly may be programmed with instructions to identify the first window of time based on identification of the first context from the game state data. So, for example, the at least one processor assembly may be programmed with instructions to provide the game state data as input to a machine learning (ML) model, receive an inference indicating the first context as an output from an activation layer of the ML model, and identify the first context from the inference. The first window of time may be a dynamic window of time, such as one that lasts as long as the first context continues during execution of the computer game.

Also if desired, the at least one processor assembly may be programmed with instructions to provide the game state data as input to a machine learning (ML) model and to receive, as an output from an activation layer of the ML model, an inference indicating the first window of time itself. The ML model may be trained using at least one dataset of game state data and ground truth windows of time during which to monitor for non-computer game controller input.

In another aspect, a method includes executing a computer game and receiving game state data related to the execution of the computer game. The method also includes identifying, based on the game state data and during the execution of the computer game, a first window of time during which to execute a command in conformance with a first non-computer game controller input to the computer game. The method further includes identifying the first non-computer game controller input during the first window of time and executing the command in relation to the computer game based on the identification of the first non-computer game controller input during the first window of time. The command is thus executed in conformance with the first non-computer game controller input.

In various examples, the first non-computer game controller input may include gesture input of a predetermined gesture and/or voice input of a predetermined voice command.

In still another aspect, a system includes at least one computer medium that is not a transitory signal. The computer medium includes instructions executable by at least one processor assembly to infer a first window of time during which to execute, for a first execution instance of a computer game, a non-computer game controller command to the first execution instance of the computer game. The first window of time does not span all of the first execution instance of the computer game. The instructions are also executable to, based on the inference, execute the non-computer game controller command during the first window of time.

Thus, in certain specific non-limiting examples the first window of time may not span all of a particular gameplay sequence of a segment or level of the computer game but may span some of the particular gameplay sequence of the segment or level of the computer game.

Also in certain non-limiting implementations, the instructions may be executable to infer the first window of time using game state data and a machine learning (ML) model. If desired, the ML model may be trained using at least one dataset of game state data, player outcomes from previous gameplay instances, and ground truth windows of time during which to execute respective non-computer game controller commands.

The details of the present application, both as to its structure and operation, can be best understood in reference to the accompanying drawings, in which like reference numerals refer to like parts, and in which:

DETAILED DESCRIPTION

Figure 1:
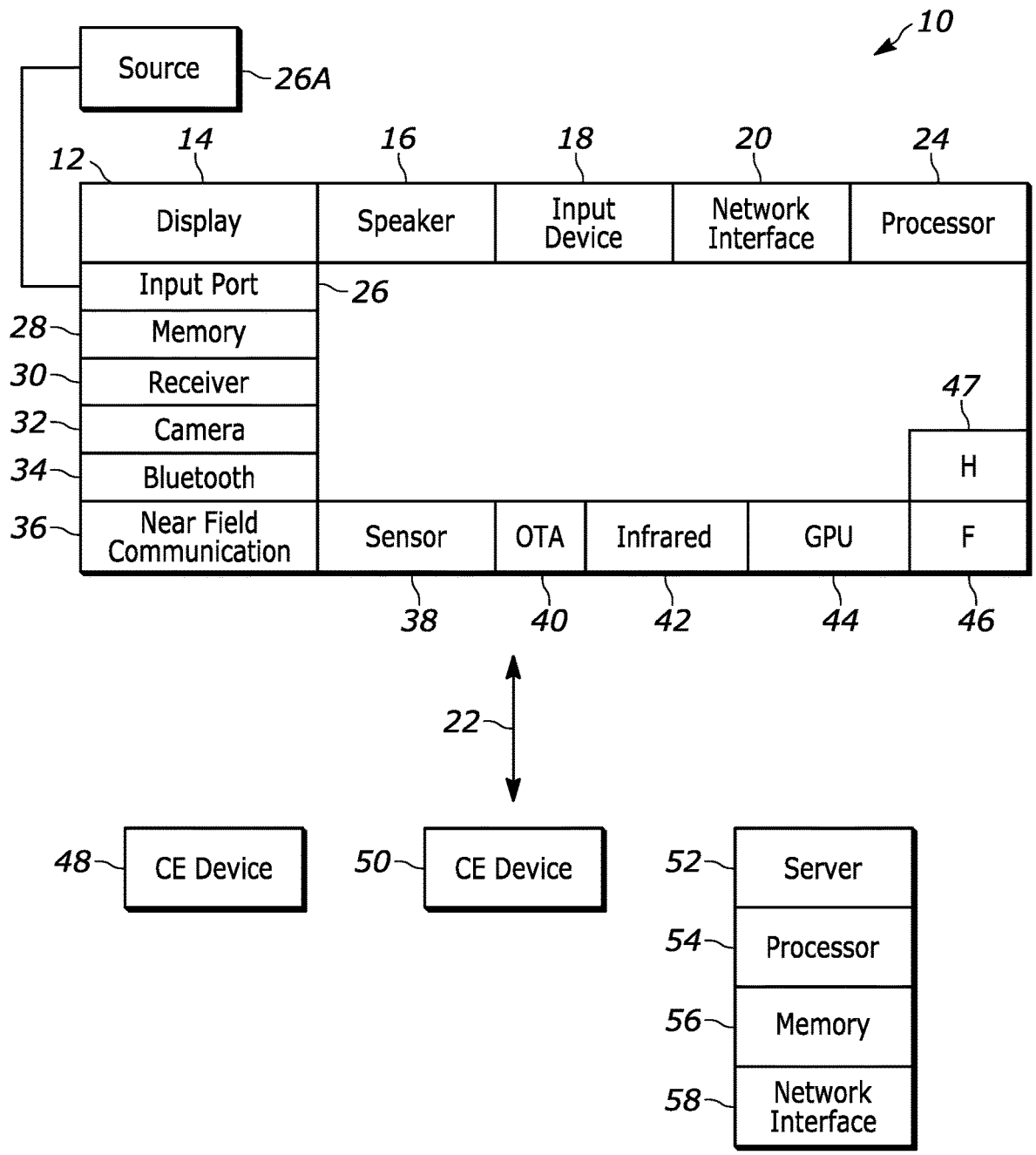
FIG. 1 is a block diagram of an example system consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor assembly may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled 5G ("smart") telephone, a tablet computer, a notebook computer, a head-mounted device (HMD) such as smart glasses or other wearable computerized device (e.g., AR or VR headset), a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a*, when implemented as a game console, may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

With the foregoing in mind, present principles concern devices and computer-implemented methods for, during play of a computer game, determining inference windows of time during which to execute game actions in conformance with gesture or voice input. Outside the window(s) of time, the system does not execute the gesture or voice commands even if it identifies them.

Thus, a game player might use buttons, analog joysticks, and triggers on a wireless video game controller to input less complex commands to the computer game. More complex actions might then be provided through gesture or voice input, where the gesture or voice input might be translated into a macro where the gesture or voice command is mapped to a series of video game controller inputs (e.g., button presses, joystick maneuvers) that are to be input to the game engine to execute the gesture or voice command itself. But to minimize false positives where the player might physically move or perform a gesture unrelated to the game, or where the player might speak to another person or even a separate digital assistant but not mean to provide voice input to the game, the device may also use an inference window that opens and closes based on game state. Thus, the system may only look for certain gestures/voice inputs to execute at certain times. The system may otherwise ignore those specific gesture/voice inputs or all gesture/voice inputs generally.

So, for example, the game engine might know the player is low on virtual character health and then open a dynamic inference window as long as the player's character is below a certain threshold level of health. The game engine may then look for appropriate player gestures/physical actions that it can interpret as drinking health potion (to improve health) during the inference window. Responsive to character health rising above the threshold level, the game engine may close the inference window and no longer look for those same player actions (e.g., at least until health drops below the threshold again).

Accordingly, various artificial intelligence (AI)-based machine learning (ML) models and techniques may be used to cut down on false positives for game execution commands. For instance, a system/model may watch the outcome of other players playing the same computer game and figure out what causes the game to end or player to fail at a task, and conversely what causes players to succeed. The system/model may then infer a window of time for a future gameplay instance under similar circumstances, thus using the past player instances to determine when to look for the same actions again that caused other players to succeed. For instance, a classifier may identify gesture/voice inputs that result in positive game impact and then look for the same actions again in the future under similar circumstances, even if the positive game impact output is not necessarily the otherwise highest-ranked possibility that is output from the model. Or the model might filter negative-impact inputs or be trained with a change in weighting based on what gesture/voice inputs might result in positive game impact to then look for those particular positive inputs while the same context in the game is occurring again (while not looking for other types of gesture/voice commands during that time that are unrelated to the context, or at least weighting them less on the possibility scale).

In terms of gestures in particular, the gestures may be non-computer game controller inputs (e.g., gestures not controlling the controller 220 below or otherwise providing input to that input device). And regardless of whether the non-computer game controller inputs are voice-based or free space gesture-based inputs, the input actions themselves that are commanded by the player might relate to, as non-exhaustive examples, moving a virtual character, having the character shoot another virtual character, selecting options from an onscreen menu, and/or drinking a health potion.

Additionally, note that the computer game itself might be a two dimensional (2D) game presented on a television or computer monitor, or might be a virtual or augmented reality (more generally, extended reality) computer game presented on a headset or smartphone. However, further note that present principles may be applied in other technological areas as well, such as non-gaming extended reality and other computing environments where user input is nonetheless used albeit not for gaming per se.

Still further, note that present principles may also be used to ignore intentionally or accidentally/erroneously repeated commands if the same command is received more than once during the inference window. Thus, the command may be executed during the inference window based on the first time the command is received and then the system may ignore/discard the same command if received again either: outside the inference window, or within the inference window but also still within a threshold amount of time of the initial command's receipt (e.g., ignore a repeated command if received within five seconds of the initial input of the command). For instance, this might occur in the case of gesture detection, like if a child spams the same gesture repeatedly to get the character to drink a health potion. Here, a health potion might only be drank once during the inference window, even if there are multiple health potions in the player/kid's inventory that might otherwise be drank within the window based on the repeated commands.

Figure 2:
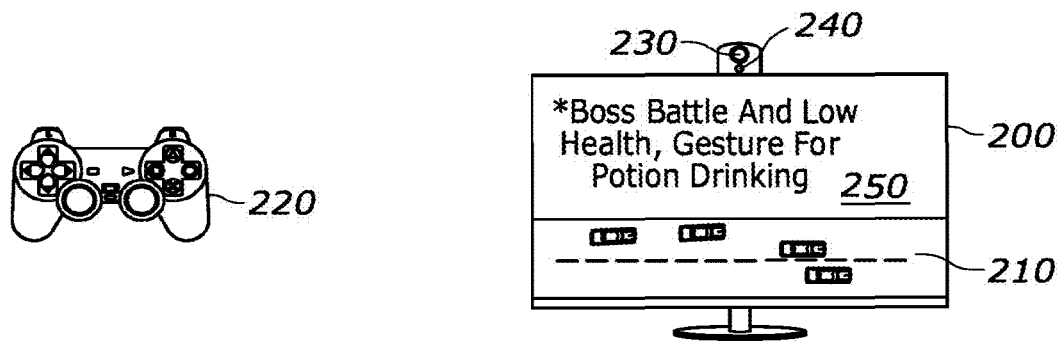
FIG. 2 shows an example schematic with an onscreen notification that may be presented to a player during real-time gameplay of a computer game, with the notification being presented based on the system inferring a dynamic window of time during which the player may provide a particular gesture or voice-based input for execution consistent with present principles.

Reference is now made to FIG. 2. As shown, a display 200 such as a computer monitor, television, or smartphone display is presenting visual game content 210 such as a first-person perspective of a player exploring a virtual world or engaging in a battle with a computer game "boss" character. A wireless video game controller 220 with push buttons, analog joysticks, and trigger buttons is also shown. The controller 220 may be used to provide controller-based commands to the game engine rendering the current instance of the computer game. The display 200 itself may therefore include hardware components for wirelessly receiving the commands from the controller 220 and executing the computer game/engine in conformance with the commands. Additionally or alternatively, the display 200 may communicate with a cloud-based server that is executing the computer game/engine and receiving the commands in order to present the game content 210 on the display 200, and/or may communicate with a local video game console (not shown) that may be executing the computer game/engine and receiving the commands in order to present the game content 210 on the display 200.

As for the non-computer game controller commands themselves, they might include gestures in free space as identified via gesture recognition using input from a camera. The camera may be in communication with the device executing the game engine, such as a camera 230 on the display 200 itself. As an example, a free space gesture might include mimicking a drinking motion by the player first making a "C" shape with his/her fingers and thumb and then raising the same hand to his/her mouth to mimic drinking from a cup. The non-computer game controller commands might also include voice commands as identified via speech recognition using input from a microphone. The microphone may be in communication with the device executing the game engine, such as a microphone 240 on the display 200 itself. The voice input might be a command to "drink potion", for example.

Figure 3:
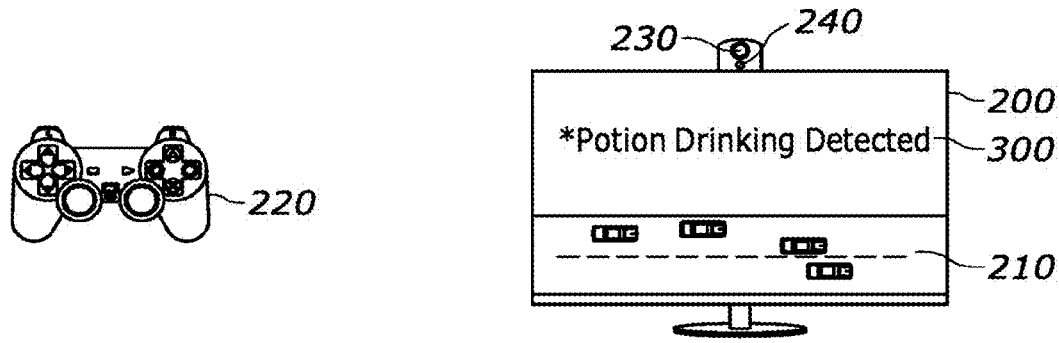
FIG. 3 shows an example schematic with another onscreen notification that notifies the player that, during the window of time, the applicable gesture or voice command has been detected and executed consistent with present principles.

Accordingly, in cross-reference to FIGS. 2-4, suppose the game engine infers based on game state data that a player is battling a non-player boss or other adversary in the computer game and that the player's own character is low on health (e.g., below a threshold health level, such as below 20% health remaining). Based on the inferences, FIG. 2 shows that a first indicator 250 may be overlaid on the game content 210 as part of a graphical user interface (GUI). The indicator 250 may provide a notification of the circumstances that led to the inference (here, boss battle and low health) and also notify the player that the game engine is currently looking for gestures the player might make that can be translated into a health potion drinking gesture command.

Then once the game engine detects/infers a free space gesture that maps to a command to drink the health potion (e.g., using input from the camera 230), the indicator 250 may be removed. FIG. 3 shows that another indicator 300 may be presented in its place. The indicator 300 indicates that a potion drinking motion has been detected. This may serve as a notification that whatever physical gesture-based action the player just took in the real world has been translated into a gesture command to the computer game and that the game engine is executing the game in conformance with the command.

Figure 4:
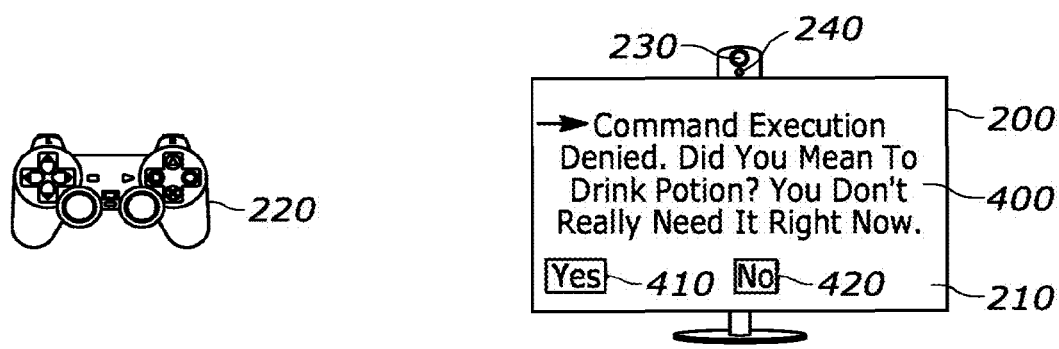
FIG. 4 shows yet another example schematic with yet another onscreen notification, this one notifying the player that execution of a particular gesture-based or voice-based command has been denied based on the command being received outside the applicable window of time consistent with present principles.

However, FIG. 4 shows that in different circumstances of the same game instance where a drinking gesture is identified but the game engine does not also infer a context for which it should execute health potion drinking voice and gesture commands, a different notification 400 may be presented instead. The notification 400 indicates that a received gesture or voice command to drink a health potion has been denied. The notification 400 might also include a prompt asking whether the player even meant to provide such input to drink a health potion, with the notification 400 further indicating that the player's character does not need the health potion right now (thereby helping the player preserve virtual inventory/assets for the future to improve gameplay).

As also shown in FIG. 4, the prompt may be accompanied by a yes selector 410 and no selector 420. The yes selector 410 may be selectable to provide affirmative input in response to the prompt, indicating that the player did in fact mean to provide a command to drink the potion. Selection of the selector 410 may therefore be used to one or both of (A) command the player's character to drink the health potion in this instance anyway (with the command being executed responsive to selection of the selector 410), and (B) command the device to perform additional training of an ML model that incorrectly inferred that an inference window for gesture-based and voice-based health potion commands was not applicable.

Selection of the selector 420 may also be used for one or two different functions as well. Specifically, selection of the selector 420 may one or both of (A) provide a command confirming the device's denial of drinking the health potion, and (2) provide a command to the device to perform additional training of the ML model to reinforce that it correctly inferred that an inference window was not applicable for the current game context(s). Thus, selection of either selector 410, 420 may not just provide input to the game engine in relation to execution of this particular game instance, but may also be used to generate labels for additional training using game context data from the current game situation to help improve the model itself.

Figure 5:
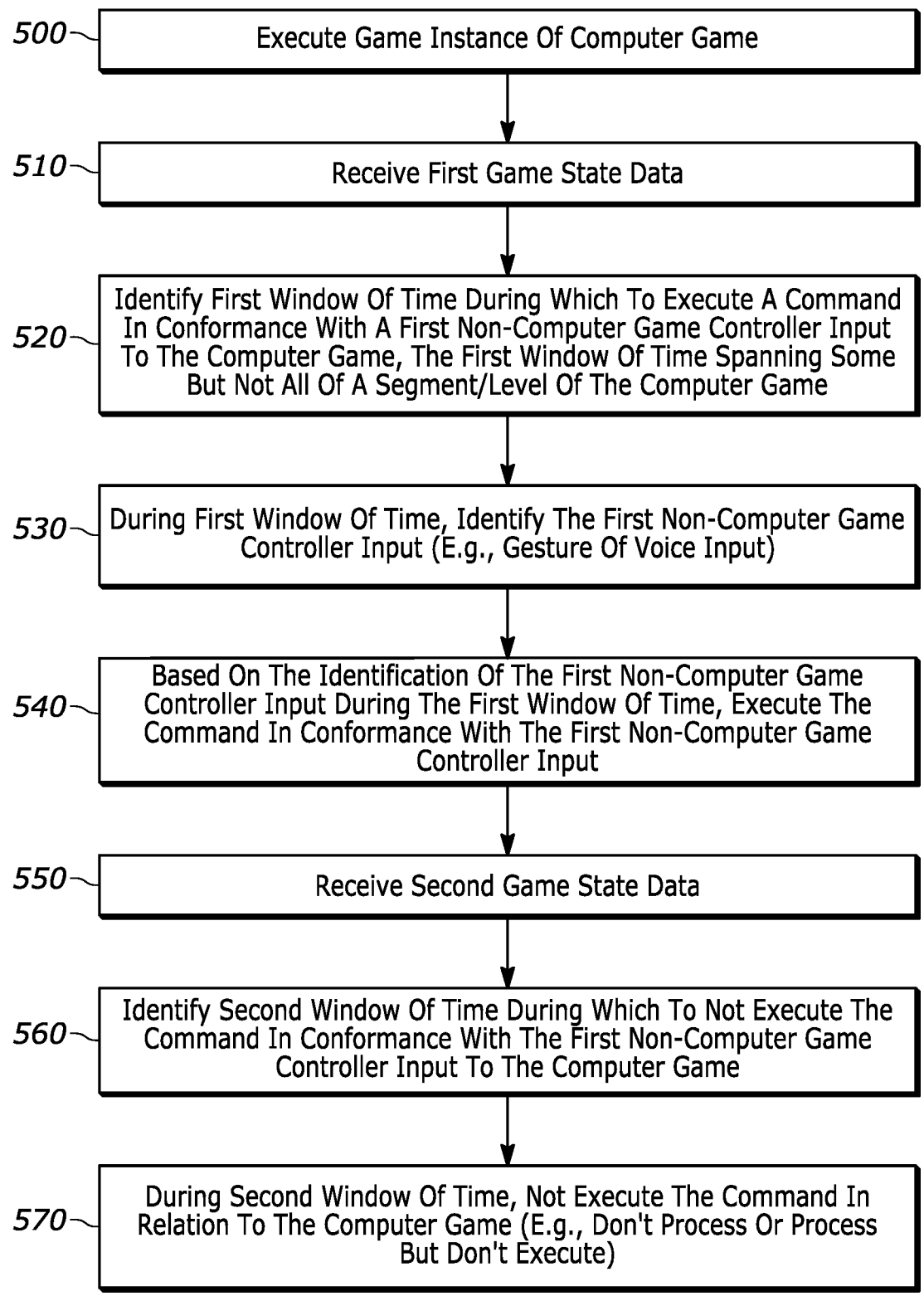
FIG. 5 is an example flow chart of example overall logic executable by one or more devices consistent with present principles.

Before describing FIG. 5, also note that while the notification 400 and corresponding selectors 410, 420 might be presented in real time while the player plays the computer game, in other instances the notification and selectors might not be presented during gameplay but instead may be presented responsive to a pause command which pauses the computer game. This may help minimize onscreen clutter that might distract the player and adversely affect gameplay.

Referring now to FIG. 5, it shows example logic that may be executed by one or more devices consistent with present principles. For example, steps in the logic of FIG. 5 may be executed by one or more of a personal computer, gaming console, and/or Internet-based cloud gaming server alone or in any appropriate combination. Note that while the logic of FIG. 5 is shown in flow chart format, other suitable logic may also be used.

Beginning at block 500, the device may execute an instance of a computer game. This might include, for example, using a game engine to load the instance of the computer game and then presenting the computer game instance both audibly and visually. From block 500 the logic may then proceed to block 510.

At block 510 the device may receive, from the game engine, first game state data related to the execution of the computer game. The first game state data may indicate a first context associated with execution of the computer game, such as being low on health while battling a boss as set forth above. Or as another example, the game state data may indicate a weapons switch may be helpful because the player's character is losing while battling the boss with a certain operative weapon (and so the device will infer a window of time during which to execute a gesture/voice command to switch virtual weapons). Game state data might also include data on the current level or stage of the game in which the player's character is located, operative menu items, items in the player's game inventory or weapons arsenal, amount of lives remaining, etc. The first context itself may be identified using a rules-based algorithm, and/or by providing the first game state data to a ML model to receive an output of the first context from an activation layer of the ML model. From block 510 the logic may then proceed to block 520.

At block 520 the device may identify, based on the game state data (e.g., first context in particular) and during the execution of the computer game, a first window of time during which to execute a command in conformance with a first non-computer game controller input to the computer game (e.g., gesture or voice input). Note here that the first window of time may span some but not all of the first execution instance of the computer game. For example, the first window of time may not span all of a particular gameplay sequence (e.g., boss battle) of a segment or level of the computer game even though it may span some of the particular gameplay sequence of the segment or level of the computer game (e.g., span only the last third of the boss battle itself).

From block 520 the logic may then proceed to block 530. At block 530, during the first window of time, the device may identify the first non-computer game controller input itself. Based on the identification of the first non-computer game controller input during the first window of time, the logic may proceed to block 540 where the device may execute the command in relation to the computer game and in conformance with the first non-computer game controller input itself. Again note that the gesture input may be identified using one or more images from the camera along with execution of computer vision algorithms such as a gesture recognition algorithm and/or action recognition algorithm. Voice input may be identified using voice data from the microphone along with execution of a speech recognition algorithm and/or speech to text algorithm.

After block 540, the logic may proceed to block 550. At block 550, the device may receive second game state data related to the execution of the computer game. The second game state data may indicate a second context associated with execution of the computer game, such as not being low on health while battling bosses or non-bosses in the same game instance. The second context may also be identified using a rules-based algorithm, and/or by providing the second game state data to the same ML model to receive an output of the second context from an activation layer of the ML model.

From block 550 the logic may move to block 560 where the device may identify, based on the second game state data and during the execution of the computer game, a second window of time during which to not execute the (same) command in conformance with the first non-computer game controller input to the computer game. Thus, at block 560 the first window of time may dynamically end based on the identified rules-based or inferred context changing from the first context to the second context.

The logic may then proceed to block 570 where, during the second window of time, the device may not execute the same command in relation to the computer game that the device was looking to execute during the first window of time. Not executing the command might therefore include not processing the first non-computer game controller input to the computer game, such as by declining to receive and/or process input from the camera or microphone or even by turning off the camera or microphone itself. Not executing the command may also include, in certain examples, processing the first non-computer game controller input to the computer game to identify the command but not actually executing the command in conformance therewith.

Additionally, note that in some examples the device might not process/execute any gesture or voice input during the second window of time. However, in other examples the device might still process/execute other gesture or voice input during the second window of time (regardless of context or for a different identified context), but may not execute the specific gesture or voice command inferred as applicable specifically during the first window of time. So, for example, gesture input to lift up and swing an ax may be inferred at any point during the execution instance of the computer game, but a somewhat similar physical action from the player to lift an imaginary cup to drink a potion would only be inferred when the player's character's health is below a threshold level while battling the boss. This may help cut down on false positives and corresponding adverse game events, such as an ax lift and swing being misinterpreted as a potion drink command when the character's health is not below the threshold health level.

Figure 6:
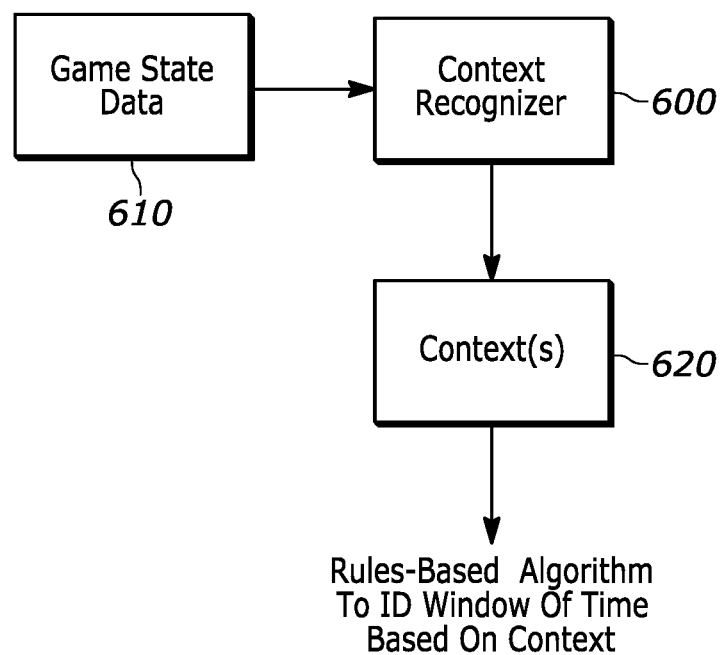
FIGS. 6 and 7 show different example artificial intelligence software architectures for different ML model(s) that may be used consistent with present principles.

Referring now to FIG. 6, example artificial intelligence architecture for an ML model that may be used consistent with present principles (including the logic of FIG. 5) is shown. The architecture includes a context recognizer/classifier 600 into which game state data 610 from a game engine may be input so that a context(s) 620 of the computer game instance may be inferred. In various non-limiting examples, the recognizer/classifier 600 may be established by one or more convolutional neural networks and/or feed-forward neural networks, such as a feed-forward backpropagation neural network (FFBPNN) in particular.

Accordingly, in cross-reference to FIGS. 5 and 6, at block 520 the device may provide the first game state data received at block 510 as the input 610 to an ML model established at least in part by the recognizer/classifier 600. The device may then receive, as an output from an activation layer of the recognizer/classifier 600, an inference indicating the first context to thus identify the first context from the inference. As also shown in FIG. 6, the identified first context(s) may then be provided at block 520 to a rules-based software algorithm, which may then be executed to identify the first window of time based on the first context using one or more rules. Using the example above, the first context(s) might therefore include both a boss battle transpiring and character health being below a threshold level of 20%, and the rules-based algorithm may determine using a relational database that under these circumstances a window of time is to begin during which the device processes gesture or voice input to drink a health-improving potion.

Figure 7:
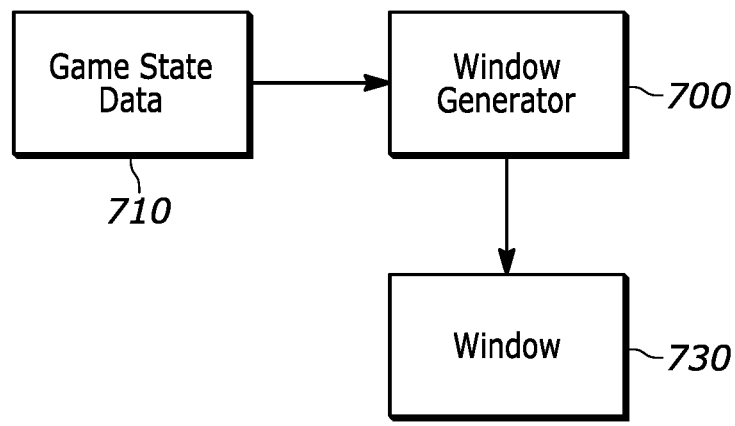

Continuing the detailed description in reference to FIG. 7, example artificial intelligence architecture for another ML model that may be used consistent with present principles (including the logic of FIG. 5) is shown. Here the architecture includes a window of time generator 700 into which game state data 710 from a game engine may be input so that a window of time 730 consistent with present principles may be inferred. In various non-limiting examples, the time generator 700 may be established by one or more convolutional neural networks and/or recurrent neural networks, such as a long short-term memory (LSTM) neural network in particular.

Accordingly, in cross-reference to FIGS. 5 and 7, at block 520 the device may provide the first game state data received at block 510 as the input 710 to an ML model established at least in part by the window generator 700. The device may then receive, as an output from an activation layer of the generator 700, an inference indicating the first window of time to thus identify the first window of time at block 520.

Therefore, using either or both of the ML models from FIGS. 6 and 7, the first window of time may be established as a dynamic window of time. Furthermore, the first window of time may last as long as the first context continues during the same game instance, and may occur more than once at different parts of the game/single game instance if the first context occurs more than once. The dynamic window of time may also end each time the first context ends during that game instance.

Figure 8:
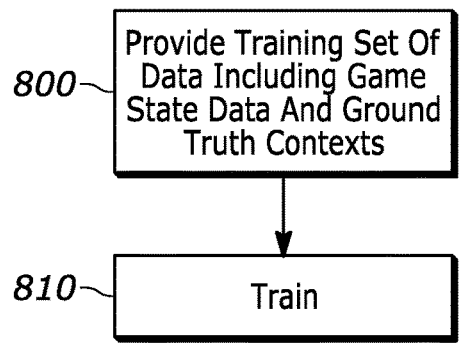
FIG. 8 shows example training logic that may be executed to train the ML model of FIG. 6 consistent with present principles.
Figure 9:
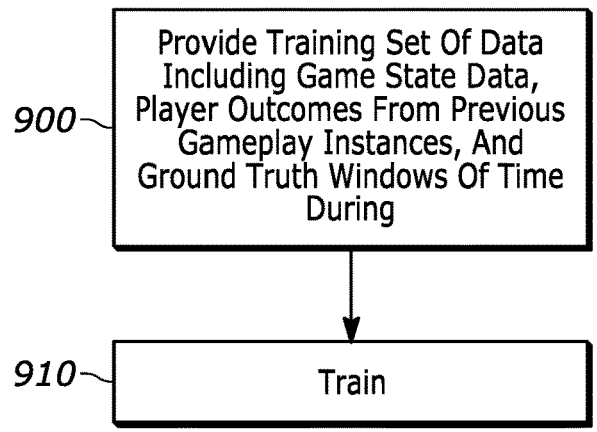
FIG. 9 shows example training logic that may be executed to train the ML model of FIG. 7 consistent with present principles.

FIGS. 8 and 9 will now be described, which respectively show training logic for training the models of FIGS. 6 and 7 before deployment and/or for additional training after deployment. Beginning first with the logic of FIG. 8, at block 800 the logic may provide, as training input, at least one dataset that includes game state data and respective ground truth game contexts. From block 800 the logic may proceed to block 810 to actually train the model using the at least one dataset. The ML model may include neural networks, decision trees, and/or support vector machines, and the training itself may include supervised, unsupervised, and/or reinforcement learning.

As an example, for supervised learning the ML model may be trained using labeled data (the labeled ground truth contexts), where each training set includes game state data of one or more different types and its corresponding ground truth context. The model may learn to map game state data to contexts by minimizing the difference between its predictions and the ground truth contexts.

As another example, for reinforcement learning, the ML model may learn to map game state data to contexts by interacting with the game environment and receiving feedback in the form of rewards or penalties for correctly or incorrectly inferring context. The model may thus learn to optimize its mapping strategy to maximize the cumulative reward over time, resulting in a model assisting in positive game impact as referenced above. Thus, inferred contexts may be used to establish a window of time during which to execute a particular gesture or voice command that might result in a positive game impact for that context, and during the same window of time the device may also not execute other specific gestures and voice commands that might result in a negative game impact for the same context.

Continuing the detailed description now in reference to FIG. 9, it too shows additional logic that may be used for training, this time in terms of the window generator 700 of FIG. 7. Accordingly, at block 900 the logic may provide, as training input, at least one dataset that includes game state data and respective ground truth windows of time during which to monitor for non-computer game controller input. In some examples, the at least one dataset may also include player outcomes from previous gameplay instances in the same or similar contexts to train on previous commands that resulted in a positive game impact in the previous gameplay instances.

From block 900 the logic may proceed to block 910 to actually train the model using the at least one dataset. This ML model may also include neural networks, decision trees, and/or support vector machines, and the training itself may include supervised, unsupervised, and/or reinforcement learning. As an example, for supervised learning the ML model may be trained using labeled data (the labeled ground truth time windows), where each training set includes game state data of one or more different types, previous player outcome data, and its corresponding ground truth window of time. The model may learn to map game state data to windows of time by minimizing the difference between its predictions and the ground truth windows.

As another example, for reinforcement learning, the ML model may learn to map game state data to dynamic time windows by interacting with the game environment and receiving feedback in the form of rewards or penalties for correctly or incorrectly inferring time windows. The model may thus learn to optimize its mapping strategy to maximize the cumulative reward over time, resulting in a model assisting in positive game impact by correctly inferring window of time for a given gesture/voice command.

Figure 10:
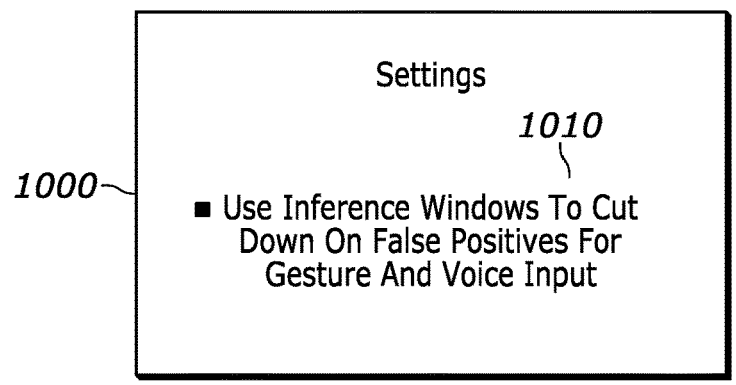
FIG. 10 shows an example settings graphical user interface (GUI) that may be used to configure one or more settings of a device to operate consistent with present principles.

Continuing the detailed description in reference to FIG. 10, an example settings graphical user interface (GUI) 1000 is shown that may be presented on a display to configure one or more settings of a client device, console, computer game, etc. to undertake present principles. The GUI 1000 may be presented based on a user navigating a device or game menu, for example.

As shown in FIG. 10, the GUI 1000 may include a first option 1010 that may be selectable a single time to set/configure the device to, in multiple future instances, control computer games by inferring windows of time during which to process and execute certain non-computer game controller inputs. Thus, again note that the inputs may include one or more specific predetermined gestures, and/or one or more specific predetermined voice commands. So, for example, selection of the option 1010 may configure the device to in the future take the actions described above, including to present the GUIs of FIGS. 2-4, execute the logic of FIG. 5, and/or use the ML models of FIGS. 6 and 7.

While the particular embodiments are herein shown and described in detail, it is to be understood that the subject matter which is encompassed by the present invention is limited only by the claims.

What is claimed is:

1. An apparatus, comprising:
   at least one processor assembly programmed with instructions to:
   execute a computer game;
   receive game state data related to the execution of the computer game;
   identify, based on the game state data and a machine learning (ML) model, and during the execution of the computer game, a first window of time during which to execute a command in conformance with a first non-computer game controller input to the computer game;
   during the first window of time, identify the first non-computer game controller input; and
   based on the identification of the first non-computer game controller input during the first window of time, execute the command in relation to the computer game, the command executed in conformance with the first non-computer game controller input.

2. The apparatus of claim 1, wherein the game state data is first game state data, and wherein the at least one processor assembly is programmed with instructions to:
   receive second game state data related to the execution of the computer game;
   identify, based on the second game state data and during the execution of the computer game, a second window of time during which to not execute the command in conformance with the first non-computer game controller input to the computer game; and
   during the second window of time, not execute the command in relation to the computer game.

3. The apparatus of claim 2, wherein not executing the command comprises not processing the first non-computer game controller input to the computer game.

4. The apparatus of claim 2, wherein not executing the command comprises processing the first non-computer game controller input to the computer game but not executing the command in conformance with the first non-computer game controller input to the computer game.

5. The apparatus of claim 1, wherein the first non-computer game controller input comprises gesture input.

6. The apparatus of claim 5, comprising a camera, wherein the gesture input is identified using one or more images from the camera.

7. The apparatus of claim 1, wherein the first non-computer game controller input comprises voice input.

8. The apparatus of claim 7, comprising a microphone, wherein the voice input is identified using voice data from the microphone.

9. The apparatus of claim 1, wherein the game state data indicates a first context associated with execution of the computer game, and wherein the at least one processor assembly is programmed with instructions to:
identify the first window of time based on identification of the first context from the game state data.

10. The apparatus of claim 9, wherein the first window of time is a dynamic window of time.

11. The apparatus of claim 10, wherein the dynamic first window of time lasts as long as the first context continues during execution of the computer game.

12. The apparatus of claim 1, wherein the ML model is trained using at least one dataset of game state data and ground truth windows of time during which to monitor for non-computer game controller input.

13. A method, comprising:
executing a computer game;
receiving game state data related to the execution of the computer game;
identifying, based on the game state data and a machine learning (ML) model, and during the execution of the computer game, a first window of time during which to execute a command in conformance with a first non-computer game controller input to the computer game;
during the first window of time, identifying the first non-computer game controller input; and
based on the identification of the first non-computer game controller input during the first window of time, executing the command in relation to the computer game, the command executed in conformance with the first non-computer game controller input.

14. The method of claim 13, wherein the first non-computer game controller input comprises one or more of: gesture input of a predetermined gesture, voice input of a predetermined voice command.

15. A system comprising:
at least one computer medium that is not a transitory signal and that comprises instructions executable by at least one processor assembly to:
infer, using a machine learning (ML) model, a first window of time during which to execute, for a first execution instance of a computer game, a non-computer game controller command to the first execution instance of the computer game, the first window of time not spanning all of the first execution instance of the computer game; and
based on the inference, execute the non-computer game controller command during the first window of time.

16. The system of claim 15, wherein the first window of time does not span all of a particular gameplay sequence of a segment or level of the computer game but spans some of the particular gameplay sequence of the segment or level of the computer game.

17. The system of claim 15, wherein the ML model is trained using at least one dataset of game state data, player outcomes from previous gameplay instances, and ground truth windows of time during which to execute respective non-computer game controller commands.

* * * * *